June 24, 1958  H. W. VAN NESS ET AL  2,840,686
HIGH SPEED RESISTANCE WELDING CONTROL
Filed Feb. 28, 1955  6 Sheets-Sheet 1

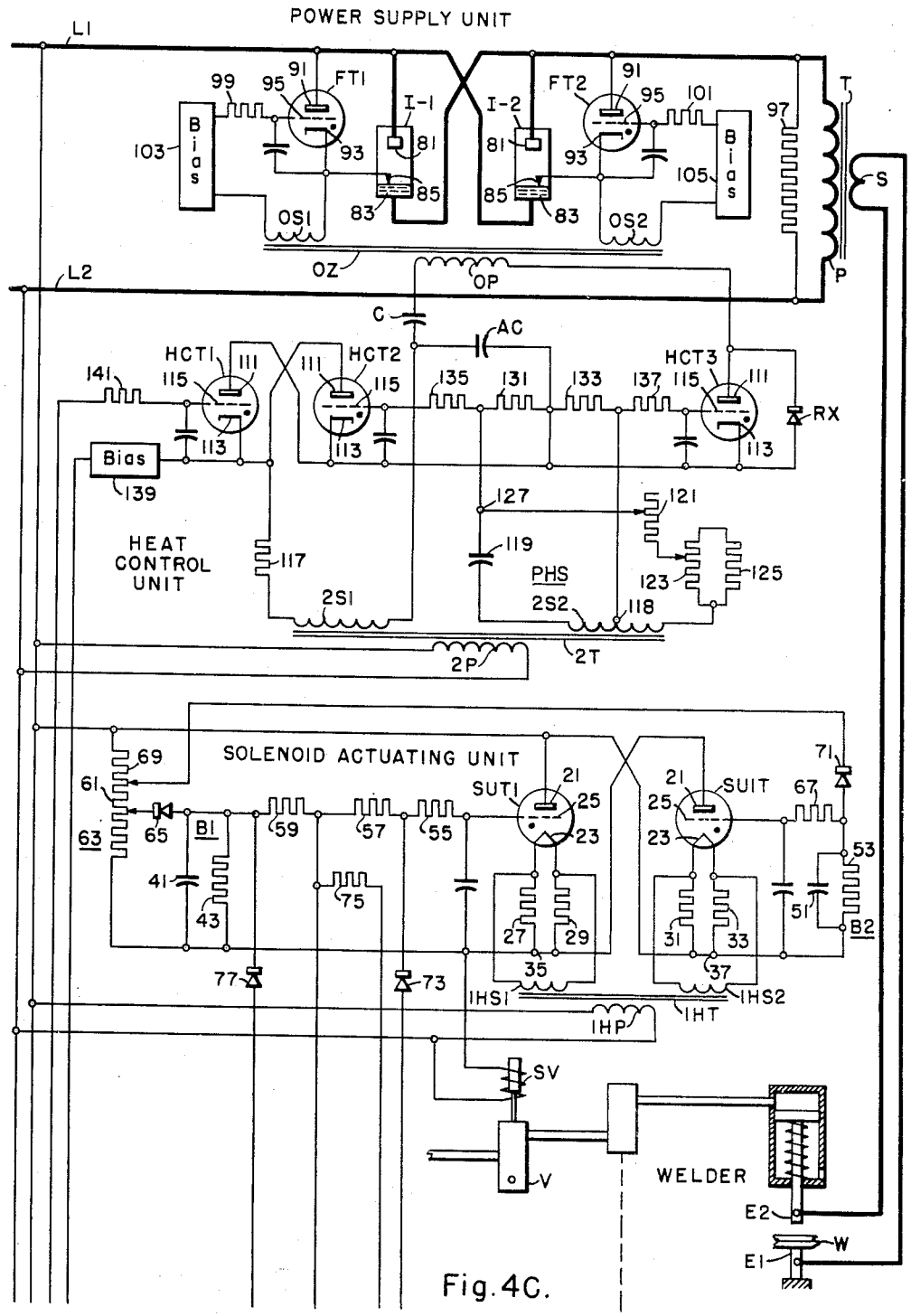

June 24, 1958

H. W. VAN NESS ET AL 2,840,686

HIGH SPEED RESISTANCE WELDING CONTROL

Filed Feb. 28, 1955

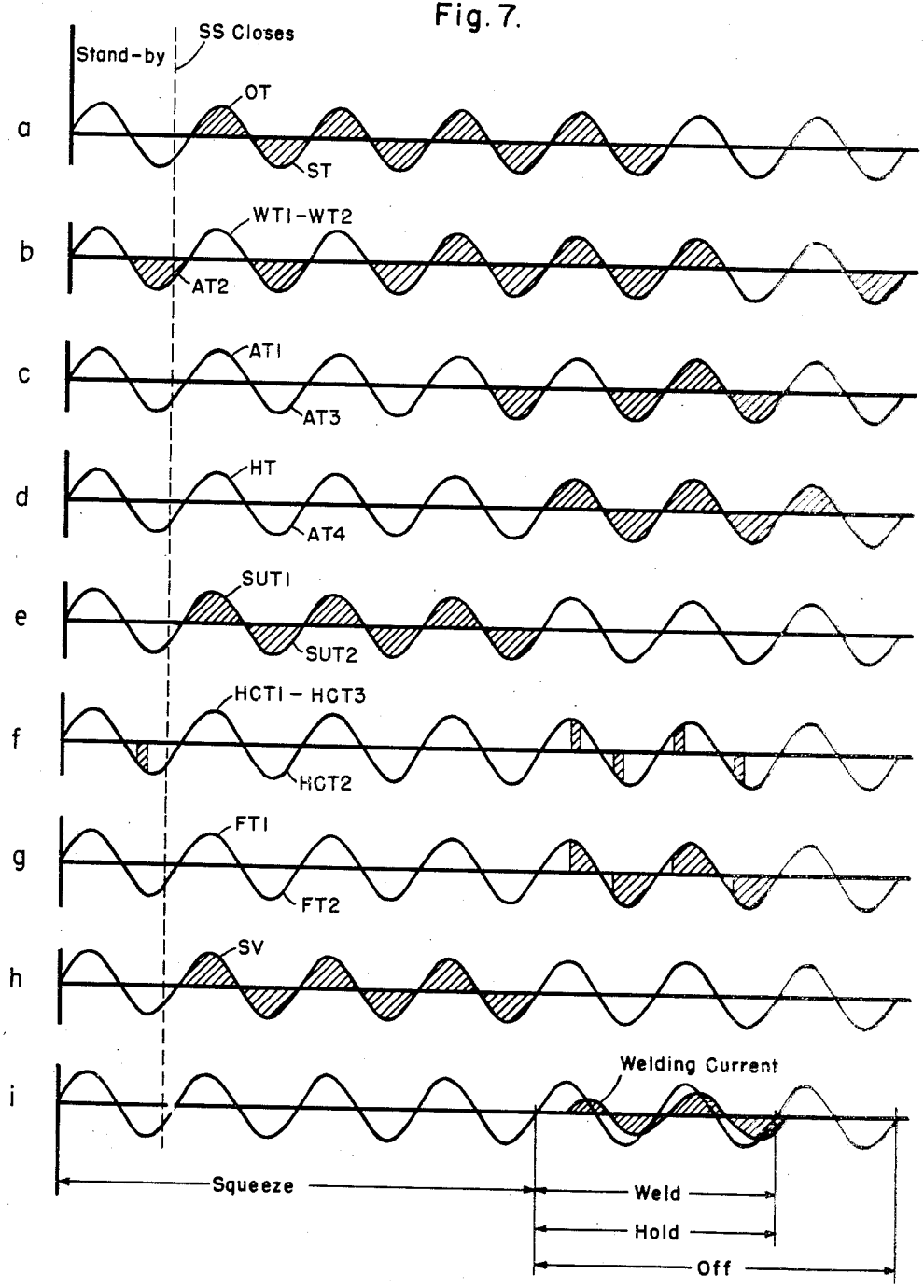

United States Patent Office 2,840,686
Patented June 24, 1958

2,840,686

HIGH SPEED RESISTANCE WELDING CONTROL

Hubert W. Van Ness, East Aurora, and William E. Large, Lancaster, N. Y., assignors to Westinghouse Electric Corporation, East Pittsburgh, Pa., a corporation of Pennsylvania Application February 28, 1955, Serial No. 490,872

16 Claims. (Cl. 219—114)

Our invention relates to electric discharge apparatus and has particular relation to control apparatus for electric resistance welding. This application relates to application, Serial No. 424,094, filed April 19, 1954 to Hubert W. Van Ness for Electric Discharge Apparatus, application Serial No. 444,318, filed July 19, 1954 to William E. Large for Electric Discharge Apparatus, application Serial No. 459,331 filed September 30, 1954 to Hubert W. Van Ness for Electric Discharge Apparatus, application Serial No. 459,332 filed September 30, 1954 to Hubert W. Van Ness for Electric Discharge Apparatus, and our application, Serial No. 490,871, filed concurrently herewith. All of the above-listed applications are assigned to the Westinghouse Electric Corporation and all are incorporated in this application by reference.

Viewed as a specific contribution, our invention arises from our effort to satisfy the demands of the automotive industry which has widely adopted the art of electric resistance welding. Many of the parts of an automotive vehicle and particularly the sheet metal parts are fabricated by welding by hand with a welding gun. Since high output is of importance in the industry, the demands for welding such parts at high speeds, as high as 600 welds per minute, has arisen and the so-called high-speed welder has come into vogue. This welder includes a sequence timer having two principal features; initial-squeeze and negative hold time. Initial squeeze is the provision of adequate squeeze time during the first weld of a series to enable the welding electrode to move from its most retracted position to the work. During subsequent welds of the series, the electrode moves only over a short distance and the additional time is not necessary. The negative hold feature has been introduced to overcome the delay in the action of the mechanical components and the compressed air system of a welding electrode which cause the electrode to engage and disengage the work. To compensate for this delay, the practice has developed of actuating the mechanical system to disengage the movable electrode from the work a certain time interval before the welding current stops flowing. The time difference between the beginning of the actuation of the electrode release mechanism and the end of the weld interval of the sequence timer is called the negative hold.

In high speed welding systems in accordance with the teachings of the prior art of which we are aware, the initial-squeeze feature introduces complexity. Provisions must be included for so controlling the initial squeeze component that it functions only for the first of a series of welds and not for the others and this complicates the sequence timer.

The negative-hold feature also introduces complexity but in this case the complication is not so much in the structure as in the use of the sequence timer. In prior art high-speed sequence timers the hold time is incorporated as an electrode closed time which is measured from the beginning of the squeeze interval. The operator sets this apparatus for a series of welds by setting variable resistors which determine respectively the squeeze time, electrode closed time, the weld time and the off time. To determine the duration of the negative-hold time for any setting, it is necessary that the squeeze plus the weld times be subtracted from the electrode close time. If the operator desires to set the apparatus for any hold time he must then reverse this arithmetic and determine what settings will give him the desired hold time. This requirement leads to confusion and frequently to wrong settings.

It is accordingly broadly an object of our invention to provide a high speed resistance welding system which shall have a sequence timer of simple structure with facilities enabling an operator to set it readily for any desired low speed or high speed operation.

Another and more specific object of our invention is to provide a sequence timer of relatively simple structure including the initial squeeze feature.

Another specific object of our invention is to provide a sequence timer capable of use in a high speed welding system and having facilities for producing negative-hold time and at the same time being capable of being set for an operation with either positive or negative hold time in the same simple manner as a sequence timer of a low speed welding system.

An ancillary object of our invention is to provide a sequence timer particularly for high speed welding including initial squeeze and negative hold time features and in addition including weld provisions which shall function effectively regardless of whether or not the apparatus is being used with a positive or negative hold time.

A further specific aspect of our invention arises from the recently developed practice in the automotive industry of including in the welding system a welding transformer having a highly magnetizable core such, for example, as a core of oriented silicon steel sold by Westinghouse under the trademark, Hipersil. As is explained in the Van Ness application, Serial No. 459,332, in prior art welding systems including a transformer with such a core, there is a tendency for the transformer to draw excessive currents because the core saturates. In application Serial No. 459,332, there is disclosed apparatus for suppressing this tendency of the welding transformer to draw excessive currents. This apparatus is satisfactory. But, it is desirable that a simpler system be developed, and it is another object of our invention is provide a welding system including a welding transformer with a readily saturable core, the tendency of which to draw excessive currents shall be suppressed without at the same time adding to the complexity of the system.

A more specific object of our invention is to provide a sequence timer which shall include facilities for suppressing the tendency of a welding transformer of the high magnetizable type from drawing excessive current.

An ancillary object of our invention is to provide a novel relay system.

It is another ancillary object of our invention to provide a novel heat control unit.

In accordance with one aspect of our invention, the structure of a high speed sequence timer involving the initial squeeze feature is simplified by adapting the novel starting circuit disclosed in our concurrently filed application, Serial No. 490,871, to control the initial squeeze timing. This novel starting circuit includes a relay which is so connected that once actuated by the closing of the starting switch it remains in actuated condition during a series of welds following the closing of the switch so long as the switch is held closed. In accordance with our invention, this relay is provided with facilities for timing out the initial squeeze time once the relay operates and preventing the initial squeeze component from being reset for a second timing operation so long as the starting switch remains closed. Thus, in simple manner, the initial squeeze is included as a part of a sequence timer in accordance with our invention.

In accordance with a further aspect of our invention, we provide a sequence timer in which the squeeze, weld, hold and off components are timed out as they are in sequence timers of low speed welding systems. But, in addition, we provide timing networks which delay respectively the starting and the termination of the flow of welding current each by a predetermined interval or by different intervals. Thus, the welding current starts to flow and stops flowing at a time interval after the end of the squeeze and weld intervals set by the timer. Where this additional time interval is longer than the hold time, there is negative hold time. The additional time interval may be a constant time interval corresponding to the desired maximum negative hold time. The actual positive or negative hold time may simply be set by setting a variable resistor as in the low speed welding systems. But, the variable resistor is provided with a dial which shows positive or negative hold time depending upon the relationship of the setting to the additional time interval which is added before the start and after the termination of the weld interval.

The aspect of our invention involving the suppression of the excessive current in welders having a welding transformer with a highly magnetizable core is involved in that discharge device of the sequence timer, the conduction of which actuates the heat control unit to energize the power supply unit to supply welding current. This discharge device is rendered conducting during a number of successive alternate half periods and for each of these alternate half periods the welding current flows during a full period, that is, two successive half periods, being initiated at instants in each of the successive half periods as predetermined by the heat control unit. In accordance with our invention, the discharge device in the sequence timer which actuates the heat control unit is rendered conducting during the first of the half periods during which it conducts at an instant approximately one-quarter period after the instant of zero potential. Thus, during the first half period during which the welding current flows, it starts approximately one-quarter period after the zero instant and the initial excessive saturation of the welding transformer is avoided.

The novel features which we consider characteristic of our invention are disclosed generally above. The invention itself both as to its organization and its method of operation together with additional objects and advantages thereof will be understood from the following description of a specific embodiment taken in connection with the accompanying drawings in which.

Figure 4A:
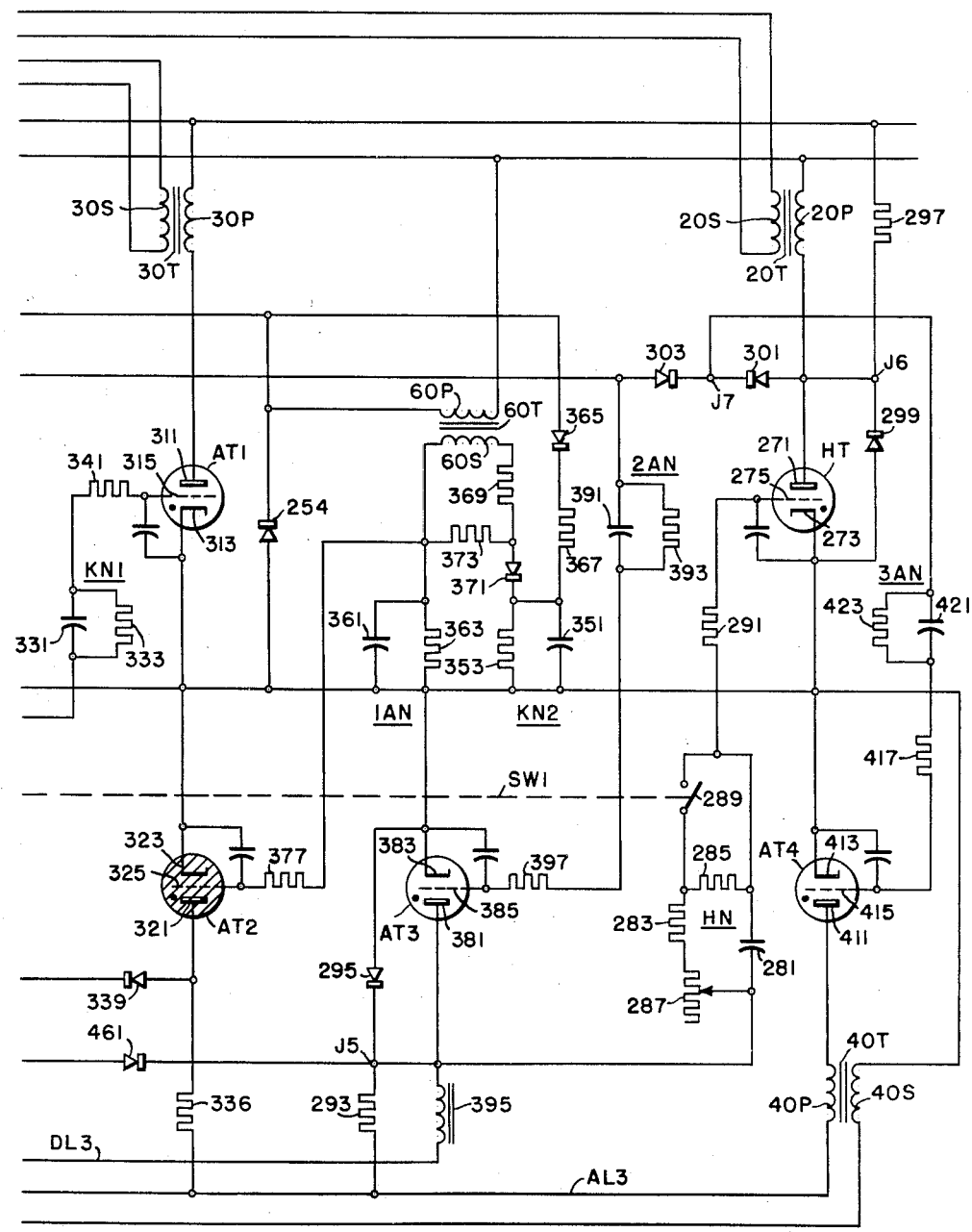
Figure 4B:
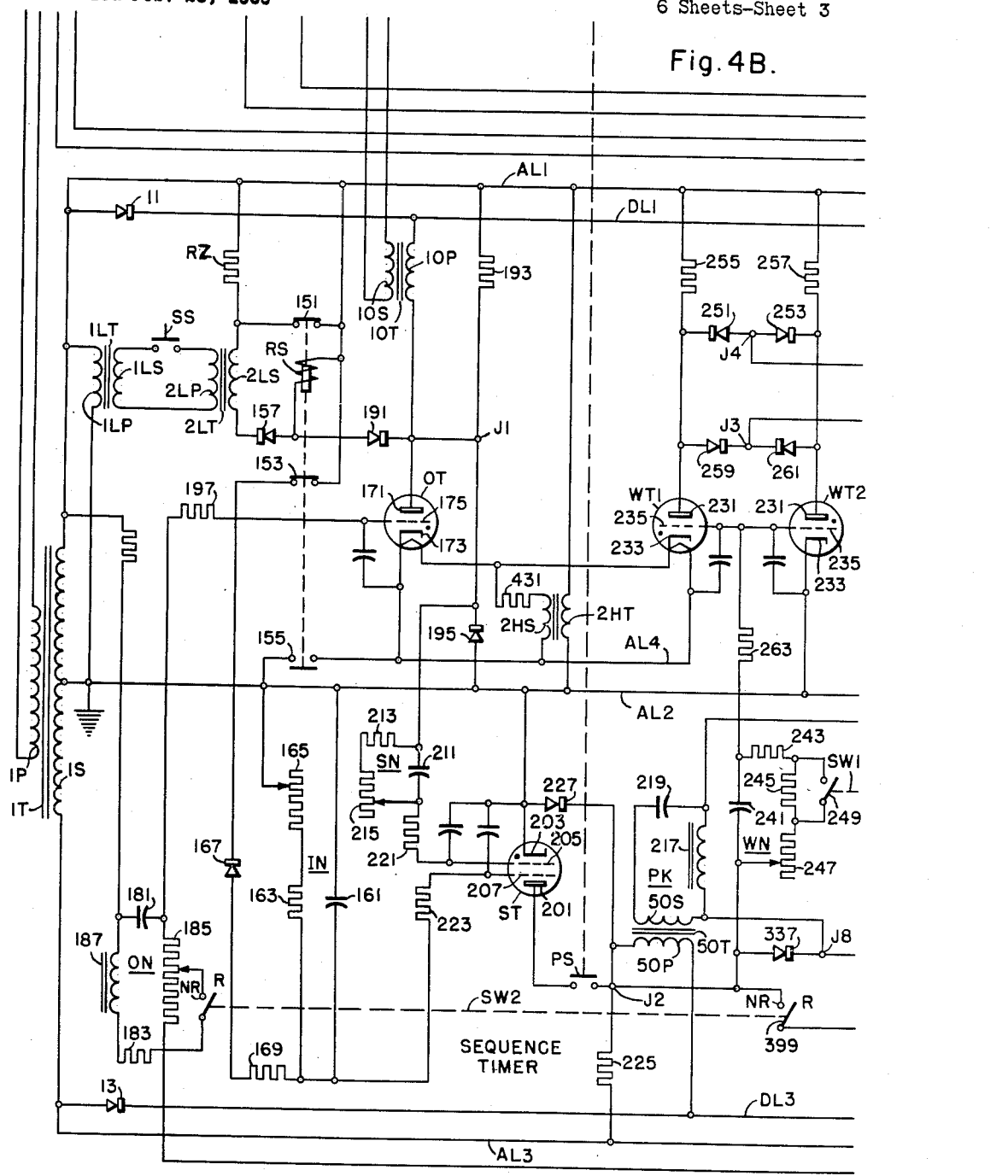
Figure 6:
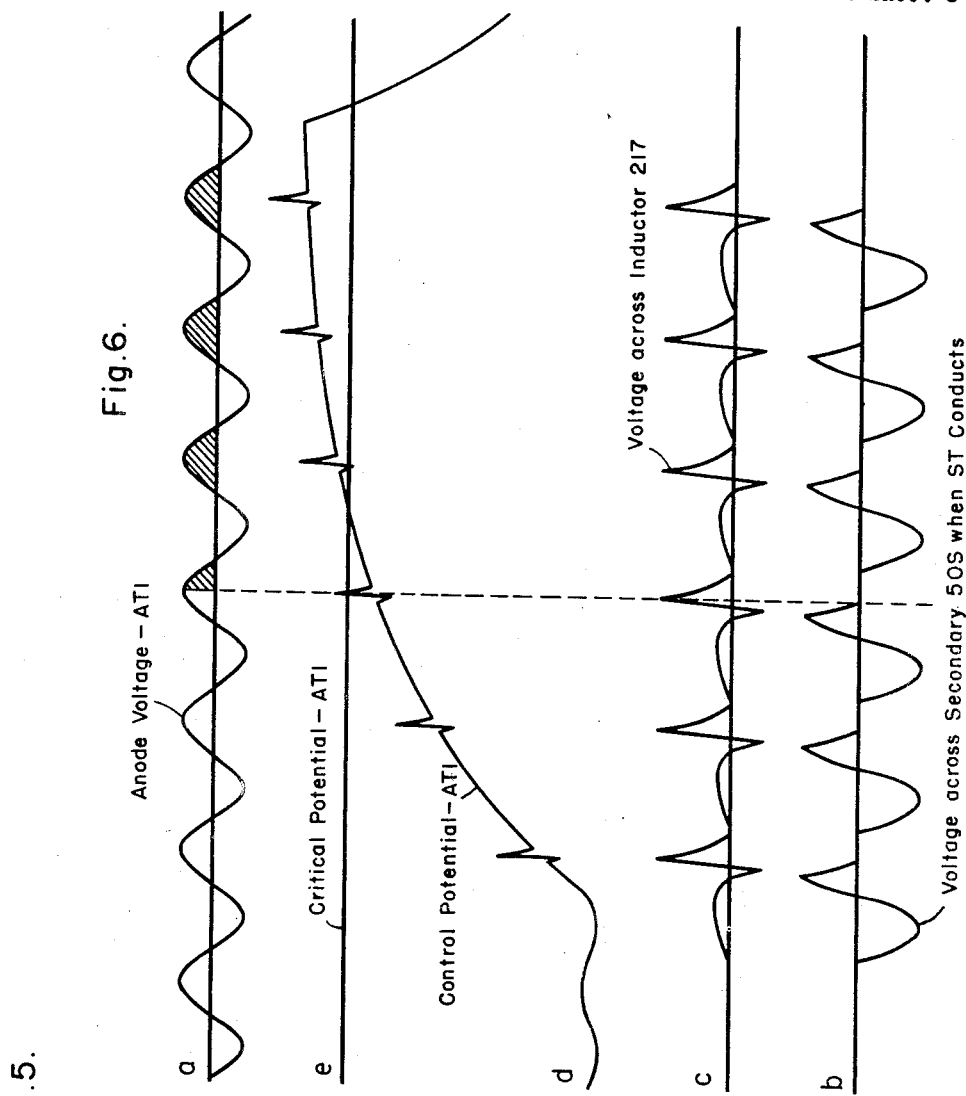
Figure 5:
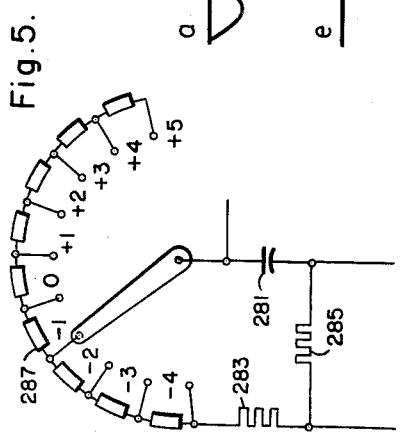

Figs. 4a, 4b and 4c together constitute a circuit diagram of a preferred embodiment of our invention;

Fig. 5 is a fragmental view showing a portion of a hold network in a sequence timer of the type shown in Figs. 4a, 4b and 4c;

Fig. 6 is a graph illustrating the operation of the apparatus shown in Figs. 4a, 4b and 4c; and Fig. 7 is a graph illustrating the operation of the apparatus shown in Figs. 4a, 4b and 4c.

One important aspect of our invention is the provision of a sequence timer having facilities for negative hold which is readily set for a welding operation. This aspect of our invention will be more readily understood by comparison with the prior art and earlier sequence timers and such comparison is presented in Figs. 1 through 3. In each of these figures, the passage of time from the start of a welding operation may be considered as flowing from left to right.

Figure 1:
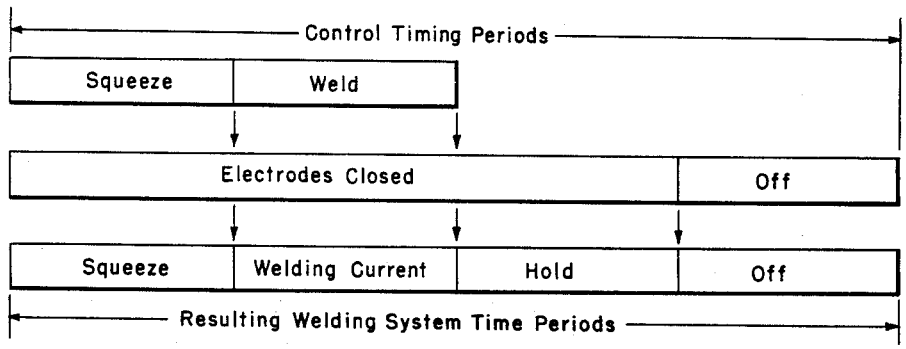
Figure 1 is a diagram presenting the operation of a sequence timer of a high speed welding system in accordance with the teachings of the prior art.

In Fig. 1, the blocks at the top just under the heading Control Timing Periods which are labeled Squeeze, Weld, Electrodes Closed and Off correspond to the settings of variable resistors in the sequence timer. The lower series of blocks labeled Resulting Welding System Timing Periods corresponds to the actual operation of the welding system. Analogous labeling is applied in Figs. 2 and 3.

Figure 1 represents the sequencing of the earliest prior art apparatus in which the negative hold feature is employed. Such apparatus includes squeeze, weld, electrode-closed and off functions. The electrode-closed function starts at the beginning of the squeeze interval and can terminate before or after the weld interval. If it terminates before the end of the weld interval, there is negative hold time. The prior art apparatus corresponding to Fig. 1 includes variable resistors for setting the squeeze, weld, electrode-closed and off times, but it has the disadvantage that the operator must make confusing calculations to determine whether he has negative or positive hold time, and the magnitude of the hold time. In addition, the duration of the off time depends on the duration of electrode-closed time and this may cause confusion or may result in mal operation of the welding system.

Figure 2:
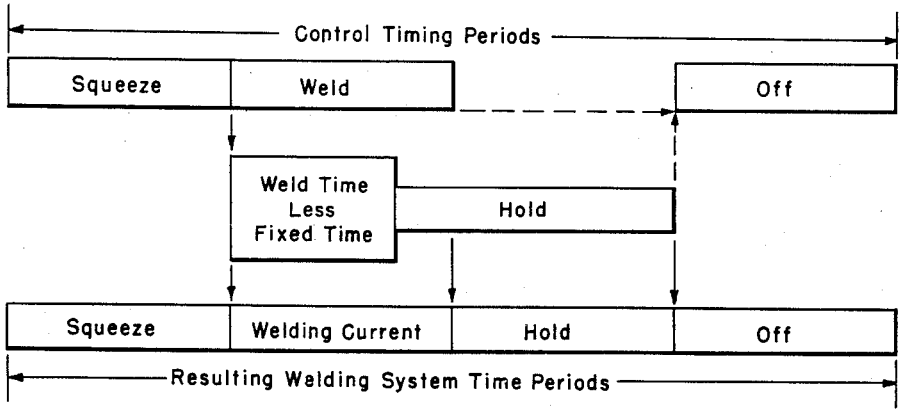
Fig. 2 is a diagram presenting the operation of the sequence timer shown in our concurrently filed application, Serial No. 490,871.

A diagram for a sequence timer of the type shown in our concurrently filed application, Serial No. 490,871, is shown in Fig. 2. In this case there is a variable resistor in the hold network which is ganged with the variable resistor in the weld network, the former being short circuited over a predetermined portion of the low resistance part of its range, so that it adds resistance in the hold network only if the weld time exceeds the maximum available negative hold time. This permits direct setting of the hold time but the additional components constitute an item of cost and complexity which it is desirable to eliminate.

Figure 3:
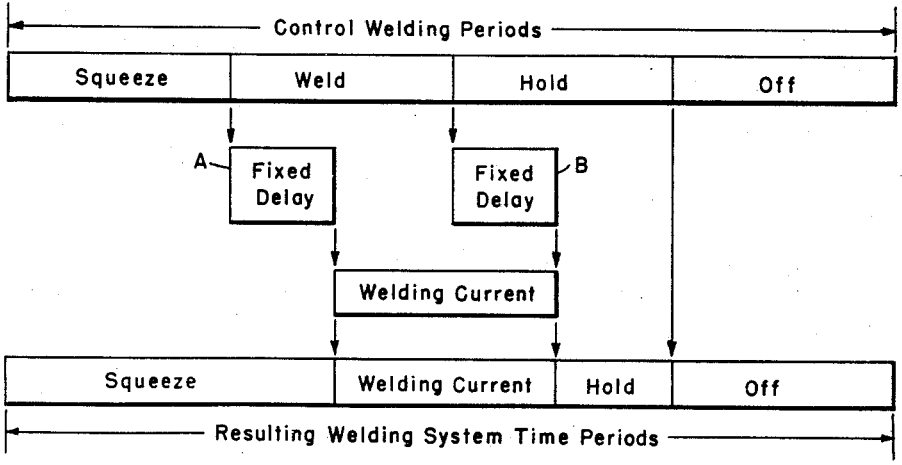
Fig. 3 is a diagram presenting the operation of a sequence timer of a welding system in accordance with our invention.

The Fig. 3 diagram presents the operation of our present sequence timer. In this sequence timer, the weld interval is started substantially immediately following the squeeze interval and the hold interval is started substantially immediately following the weld interval but the start and the termination of the welding current as distinct from the weld interval is spaced in time with reference to the start and termination of the weld interval, the delay being preferably fixed and equal to the desired maximum negative weld time. Whether or not there is negative hold time depends on the relationship between the hold setting and the delay. If the hold network is set for a time interval less than the fixed delay, there is negative hold.

DESCRIPTION

The apparatus shown in Figs. 4a, 4b and 4c is a welding system which includes a novel sequence timer for producing operation corresponding to Fig. 3 and in addition facilities for achieving the other object of our invention. This system includes a Welder, a Solenoid Actuating Unit, a Power Supply Unit, a Heat Control Unit, and a Sequence Timer. Power for the system is derived from conductors or buses L1, L2 which are connected to the usual alternating current commercial buses supplying normal 220, 440 or high voltages. The Sequence Timer is usually supplied at a different voltage than that available across the conductors L1 and L2 and it derives its power from a transformer 1T having a primary 1P supplied from the conductors L1 and L2 and a secondary 1S having an intermediate terminal which is preferably grounded. The end terminals and the intermediate terminal of the secondary 1S are connected respectively to auxiliary conductors or buses AL1, AL3 and AL2. In addition, there are the conductors or buses DL1 and DL3, which supply half-wave direct current potential derived from the terminals of the secondary 1S through rectifiers 11 and 13 respectively, and a conductor AL4 which is normally deenergized.

The Welder includes a pair of welding electrodes E1 and E2, the electrode E2 being actuable under air pressure to engage work W disposed on electrode E1. The pressure is controlled by a valve V which is normally closed but may be opened by energizing an alternating current solenoid SV. When adequate pressure is built up between the electrodes E1 and E2, a pressure switch PS in the Sequence Timer is closed.

The Welder also includes a welding transformer T having a primary P and a secondary S. The secondary S is connected across the electrodes E1 and E2.

The Solenoid Actuating Unit includes a pair of thyratrons SUT1 and SUT2. Each thyratron has an anode 21, a cathode 23, and a control electrode 25. The anodes 21 and cathodes 23 are connected in inverse or anti-parallel to the conductors L1 and through the solenoid SV to the conductor L2. When the thyratrons SUT1 and SUT2 are conducting, the solenoid SV is supplied with welding current and the valve V is open.

The cathodes 23 of the thyratrons are supplied with heating current from a transformer 1HT, the primary 1HP of which is connected between the conductors L1 and L2 and the secondaries 1HS1 and 1HS2 of which are connected across the cathodes. Balancing resistors 27, 29 and 31, 33 of low resistance connect the cathodes each to common junctions 35 and 37, respectively. Biasing networks B1 and B2 are provided for blocking the conduction of the thyratrons SUT1 and SUT2, respectively. Each network includes a capacitor 41 and 51 shunted by a resistor 43 and 53. The network B1 is connected through a grid resistor 55, a counteracting resistor 57 and another resistor 59, between the control electrode 25 and the junction 35, that is, in effect to the cathode 23 of thyratron SUT1 and to the anode of SUT2. At the terminal remote from the cathode 23 of SUT1, the network is connected to the cathode 23 of thyratron SUT2 through a portion 61 of a variable resistor 63 and a rectifier 65 poled to conduct positive current from the network B1 to the cathode 23. By positive current, I mean the flow of positive ions or holes as distinct from electrons. It is seen that when thyratron SUT2 is non-conducting, network B1 is charged by the open circuit voltage across thyratron SUT2 to a blocking potential.

Network B2 is connected between the control electrode 25 of thyratron SUT2 and the junction 37 of the resistors in the cathode circuit of this thyratron through a grid resistor 67. The terminal of network B2 remote from the cathode 23 of thyratron SUT2 is connected to the anode 21 of thyratron SUT1 through a portion 69 of the variable resistor 63 and a rectifier 71 poled to conduct positive current from the network B2 to the anode. The network B2 is then charged to a blocking potential when the thyratron SUT1 is not conducting.

Across the counteracting resistor 57 in the control circuit of thyratron SUT1, the secondary 10S of an output transformer 10T of the Sequence Timer is connected through a rectifier 73, poled to conduct positive current through the counteracting resistor in a direction from the control electrode 25 to the cathode 23 of thyratron SUT1 and a resistor 75. Across the other resistor 59, the secondary 20S of an output transformer 20T of the Sequence Timer is also connected through a rectifier 77 poled to conduct positive current through the other resistor 59 in a direction from the cathode 23 to the control electrode 25. Current flow induced through the secondary 10S then tends to render thyratron SUT1 conducting and current induced from the secondary 20S tends to render SUT1 non-conducting.

A Solenoid actuating unit which I have built and found to operate satisfactory includes the following components:

| Component | Value |
|---|---|
| Thyratrons SUT1 and SUT2 | each Westinghouse WL-5664. |
| Resistors 41, 51 in networks B1 and B2 | each 10,000 ohms. |
| Capacitors 43, 53 in networks B1 and B2 | .5 microfarad. |
| Grid resistors 55 and 67 | 1/10 megohm. |
| Variable resistor 63 | 12,000 ohms. |
| Counteracting resistor 55 | 22,000 ohms. |
| Other resistor 59 | 10,000 ohms. |
| Series resistor 75 | 10,000 ohms. |
| Potential of secondary 10S | 200 volts peak. |
| Potential of secondary 20S | 200 volts peak. |
| Resistors 27, 29, 31, 33 | each 1 ohm. |

Naturally the magnitude and the character of the above-listed components can be changed over a wide range and the above list is intended only to help those skilled in the art practice our invention and not in any way to limit the scope of our invention.

The Power Supply Unit includes a pair of ignitrons I-1 an I-2, each ignitron having an anode 81, a cathode 83 and an ignitor 85. For firing the ignitrons, a pair of firing tubes FT1 and FT2 are provided, each having an anode 91, a cathode 93 and a control electrode 95. The anodes 81 and the cathodes 83 of the ignitrons I-1 and I-2 are connected in anti-parallel or inverse parallel between the conductor L1 and one terminal of the primary P of the welding transformer T. The other terminal of the primary P is connected to the conductor L2. The ignitrons when rendered conducting thus conduct alternating current through the primary P. A surge suppressing resistor 97 is connected in parallel with the primary P.

The anode 91 of each of the thyratrons FT1 and FT2 is connected respectively to the anode 81 of the associated ignitron I-1 and I-2. The cathode 93 of each thyratron is connected directly to the ignitor 85 of the associated ignitron. The control electrode 95 of each thyratron FT1 and FT2 is connected to its cathode 93 through a grid resistor 99 and 101 blocking bias 103 and 105 and the secondaries OS1 and OS2 of an output transformer OZ, the primary OP of which is supplied from the Heat Control Unit. A power Supply Unit which has been found to operate satisfactorily includes:

| Component | Value |
|---|---|
| Ignitrons I-1 and I-2 | of any size suitable for the load to be supplied. |
| Thyratrons FT1 and FT2 | each Westinghouse WL-5796. |
| Grid resistors 99, 101 | 1/10 megohm. |
| Blocking bias | 50 volts. |
| Potential of secondaries OS1 and OS2 | 100 peak volts. |

The above components are listed with the same understanding as the components of the Solenoid Actuating Unit.

The Heat Control Unit is of the general type disclosed in Large application, Serial No. 444,318, but includes a novel feature which improves its operation. The Unit is supplied from a transformer 2T having a primary 2P connected to the conductors L1 and L2 and secondaries 2S1 and 2S2 and includes thyratrons HCT1, HCT2 and HCT3 each having an anode 111, a cathode 113 and a control electrode 115. The Heat Control Unit also includes a main capacitor C and an auxiliary capacitor AC. The anodes 111 and cathodes 113 of the thyratrons HCT1 and HCT2 are connected in inverse parallel through a resistor 117 to one terminal of the secondary 2S1. The other terminal of the secondary 2S1 is connected through the main capacitor C and the primary OP to the anode 111 of thyratron HCT3. The circuit is completed by a connection between the cathode 113 of thyratron HCT3 and the common junction of the cathode 113 of thyratron HCT2 and the anode 111 of thyratron HCT1. A rectifier RX is connected across thyratron HCT3 poled to conduct oppositely to thyratron HTC3. The anodes 111 and cathodes 113 are also connected in a series circuit including resistor 117, secondary 2S1 and capacitor AC.

The other secondary 2S2 has an intermediate tap 118 and is connected in a phase shift circuit PHS with a capacitor 119 and a pair of variable resistors 121 and 123 one of which, 123, is shunted by a fixed resistor 125. The output potential of this phase shift circuit PHS is derived between the intermediate tap 118 and the junction 127 of the capacitor 119 and the resistors 121, 123, 125 and is displaced in phase with respect to the potential derived from the conductors L1 and L2 by a magnitude depending on the setting of the variable resistor 121 and 123. Across the output terminals 118 and 127 of the phase shift network PHS, a voltage divider consisting of a pair of resistors 131 and 133 of equal magnitude is connected. The center of this divider is connected to the junction of the cathodes 113 of thyratrons HCT3 and HCT2. The output terminals 118 and 127 of the network PHS are also connected each to the control electrode 115 of an associated thyratron HCT2 and HCT3 through a grid resistor 135 and 137. Potentials in opposite phase are thus impressed from the network PHS between the control electrode 115 and the cathode 113 of each of the thyratrons HCT2 and HCT3.

Thyratrons HCT2 and HCT3 do not include blocking bias and conduct if their anode-cathode circuits are complete. The anode-cathode circuit of thyratron HCT2 is completed through the rectifier RX connected across thyratron HCT3 and it can initially conduct. The anode-cathode circuit of thyratron HCT3 may be completed through the thyratron HCT1 and thyratron HCT3 cannot conduct unless thyratron HCT1 can conduct. Potential is impressed between the control electrode and the cathode of thyratron HCT1 from the secondary 30S from a transformer 30T of the Sequence Timer through a blocking bias 139 and a grid resistor 141. The blocking bias is such that in the absence of potential on the secondary 30S, thyratron HCT1 is non-conducting.

The Heat Control Unit is similar to the one disclosed in Large application, Serial No. 444,318, except that our Unit includes in addition the capacitor AC connected between the terminal of the secondary to which the main capacitor C is connected and the common junction of the cathodes 113 of thyratrons HCT3 and HCT2 and the resistor 117 between the secondary 2S1 and the cathode 113 of thyratron HCT1. It is seen that if the capacitor AC is uncharged when thyratron HCT1 is rendered conducting, the initial current will flow through the capacitor AC and not through any circuit including thyratron HCT3 and, thus, the flow of undesired transient current through the primary OP will be prevented.

A Heat Control Unit which we have constructed and found to operate satisfactorily includes the following components:

| | |
|---|---|
| Thyratrons HCT1, HCT2 and HCT3 | each Westinghouse WL–2050. |
| Main capacitor C | .047 microfarad. |
| Auxiliary capacitor AC | .047 microfarad. |
| Resistor 117 | 4700 ohms. |
| Voltage across secondary 2S1 | 115 v. R. M. S. |
| Voltage across secondary 2S2 | 115 v. total. |
| Phase shift capacitor 119 | .5 microfarad. |
| Variable resistor 121 | 5,000 ohms. |
| Variable resistor 123 | 10,000 ohms. |
| Shunt resistor 125 | 15,000 ohms. |
| Voltage divider resistors 131, 133 | each 60,000 ohms. |
| Grid resistors 135, 137, 141 | each .1 megohm. |

The above listing is presented with the same understanding as the listing in the Solenoid Actuating Unit.

The Sequence Timer includes a starting circuit SC and a plurality of timing networks including an initial squeeze network IN, a squeeze network SN, a weld network WN, a hold network HN, and an off network ON. In addition, the Sequence Timer includes a plurality of networks KN1 and KN2 for introducing delay between the timing out of the squeeze network and the weld network and the start and termination of the flow of welding current. Further, the Sequence Timer includes a plurality of auxiliary networks 1AN, 2AN and 3AN. Further, the Sequence Timer includes a plurality of main thyratrons, an off thyratron OT, a squeeze thyratron ST, weld thyratrons WT1 and WT2 and hold thyratron HT. In addition, there are auxiliary thyratrons AT1, AT2, AT3 and AT4.

The starting circuit includes a supply transformer 1LT which is energized from a section of the secondary 1S and the secondary 1LS of which is adapted to supply a low voltage of the order of 24 volts. The starting circuit also includes an output transformer 2LT, the primary of which is adapted to be connected through a starting switch, push button or trigger SS on a welding gun to the secondary 1LS. The secondary 2LS of the transformer 2LT is capable of supplying a voltage of the order of 110 volts.

The starting circuit also includes a starting relay RS having a pair of normally closed contacts 151 and 153 and a normally open contact 155. The secondary 2LS is connected across the coil of the starting relay RS through one of the normally closed contacts 151 and through a rectifier 157 poled to conduct positive current from the coil to the secondary. The normally closed contact 151 shunts out a resistor RZ. When the relay RS is actuated, this resistor RZ is in series with the coil and when the current flow through the coil is interrupted, the resistor allows the current to decay rapidly and thus highly accelerates the dropping out of the relay RS. The normally open contact of relay RS is adapted to connect conductor AL4 to conductor AL2 when the relay is actuated.

The initial squeeze network IN includes a capacitor 161 shunted by a fixed resistor 163 and a variable resistor 165. This network is connected between conductor AL1 and conductor 3L2 through the other closed contact 153 of relay RS, a rectifier 167 poled to conduct positive current towards the conductor AL1 and a resistor 169. When the relay RS is deenergized, the network IN is then charged with its plate remote from the conductor AL2 negative relative to the other plate. When the relay RS is actuated, the network IN discharges.

The thyratron OT includes an anode 171, a cathode 173 and a control electrode 175. The network ON includes a capacitor 181 shunted by a fixed resistor 183, a variable resistor 185 and an inductance 187. The anode 171 of thyratron OT is connected to conductor DL1 through the primary 10P. The cathode 173 is connected to the conductor AL4. The anode 171 of thyratron OT is also connected to the coil of relay RS through a rectifier 191 poled to conduct positive current from the coil to the anode. Further, a resistor 193 and a rectifier 195 are connected between the conductors AL1 and AL2 having a junction J1. The rectifier is poled to conduct positive current from the conductor AL2 to the conductor AL1. The junction J1 is connected to the anode 171 of thyratron OT. The control electrode 175 of thyratron OT is connected to the conductor AL2 through a grid resistor 197, the network ON and the secondary 40S of an output transformer 40T.

The squeeze thyratron ST has an anode 201, a cathode 203, a first control electrode 205 and a second control electrode 207. The squeeze network SN consists of a capacitor 211 shunted by a fixed resistor 213 and a variable resistor 215. The anode 201 is connected to the conductor DL3 through the pressure switch PS and the primary 50P of an output transformer 50T. The secondary 50S of this transformer is connected in a peaking network PK with an inductor 217 and a capacitor 219 and produces a potential of short duration compared to a period of the supply across the inductor 217 when current flows through the primary 50P. The cathode 203 of thyratron ST is connected to conductor AL2. The first control electrode 205 of thyratron ST is connected to the junction J1 through a grid resistor 221 and the squeeze network SN. The second control electrode 207 is connected to the cathode 203 through the grid resistor 223 and the initial squeeze network IN.

A resistor 225 and a rectifier 227 are connected in series between the conductors AL3 and AL2 with the rectifier poled to conduct positive current from AL2 to AL3. The junction J2 of this resistor and rectifier is adapted to be connected to the anode of thyratron ST through the pressure switch PS.

Each of the thyratrons WT1 and WT2 has an anode 231, a cathode 233 and a control electrode 235. These thyratrons WT1 and WT2 have substantially the same characteristics. The weld network WN consists of a capacitor 241 shunted by a pair of fixed resistors 243 and 245 and a variable resistor 247. The resistor 245 is adapted to be shunted out by a contact 249 of the switch SW1 for setting the apparatus for high speed. Each of the anodes 231 is connected to the conductor DL1 through the primary 60P of an output transformer 60T and rectifiers 251 and 253 poled to conduct positive current from the primary 60P to the anode 231. The rectifiers 251 and 253 have a common junction J4 which is also connected to conductor AL2 through a rectifier 254 poled to conduct positive current from the conductor AL2 to the junction J4. Each of the anodes 231 is also connected to the conductor AL1 through resistors 255 and 257. The cathode 233 of thyratron WT1 is connected to conductor AL4 and the cathode 233 of thyratron WT2 is connected to conductor AL2. A pair of rectifiers 259 and 261 are connected respectively between a junction J3 and the anodes 231 of each of the thyratrons WT1 and WT2. These rectifiers 259 and 261 are poled to conduct positive current each from its associated anode to the junction J3. The control electrodes 235 of thyratrons WT1 and WT2 are connected together and their common junction is connected through a grid resistor 263 and the weld network WN to the junction J2. It is seen that junction J3 approaches the potential of conductor AL1 if either thyratron WT1 or thyratron WT2 is not conducting, but is at the potential of conductor AL2 if both thyratrons WT1 and WT2 are conducting.

The hold thyratron HT has an anode 271, a cathode 273 and a control electrode 275. The hold network HN includes a capacitor 281 shunted by a pair of fixed resistors 283 and 285 and a variable resistor 287. Resistor 285 may be shunted out when the apparatus is set for high speed by a contact 289 of the switch SW1. The variable resistor 287 in the hold network HN is of the type shown in Fig. 5. At the beginning of its scale, this variable resistor may be set for negative hold and is so labelled. Thus, in the lowest setting there is a negative hold of four periods; in the next setting, the negative hold is three and so on until the zero setting. From then on the resistor 287 is set for positive hold time and is so labelled. The anode 271 of thyratron HT is connected to conductor DL1 through the primary 20P. The cathode 273 of thyratron HT is connected to conductor AL2. The control electrode 275 is connected through a grid resistor 291 and the network HN to the junction J5 of a resistor 293 and rectifier 295 connected between the conductors AL3 and AL2 with the rectifier 295 poled to conduct positive current from the conductor AL2 to the conductor AL3. A resistor 297 and a rectifier 299 having a junction J6 are connected between the conductor AL2 and the conductor AL1 with the rectifier 299 poled to conduct positive current from the conductor AL2 to the conductor AL1. The anode 281 of thyratron HT is connected to junction J6. The anode 281 of thyratron HT is also connected to a junction J7 through a rectifier 301 poled to conduct positive current from the anode 281 to the junction J7. Another rectifier 303 is connected between the junction J3 and the junction J7 and this rectifier is poled to conduct positive current from the junction J3 to the junction J7. It is seen that junction J7 is at a potential approaching that of conductor AL1 if thyratron WT1, thyratron WT2 or thyratron HT is not conducting and is at a potential approaching conductor AL2 if thyratrons WT1, WT2 and HT are all conducting. The thyratron AT1 has an anode 311, a cathode 313 and a control electrode 315.

Thyratron AT2 has an anode 321, a cathode 323 and a control electrode 325. The network KN1 has a capacitor 331 shunted by a resistor 335. The anode 311 is connected to the conductor AL1 through the primary 30P. The cathode 313 is connected to the conductor AL2. The anode 321 of thyratron AT2 is connected to conductor AL3 through a resistor 336; the cathode 323 is connected to conductor AL2. The control electrode 315 is connected to a junction J8 of a pair of rectifiers 337 and 339 through the peaking network PK, the network KN1 and a grid resistor 341. One of the rectifiers 339 is connected between the anode 321 of thyratron AT2 and the junction J8 and the other rectifier 337 is connected between the junction J2 and the junction J8, and the rectifiers 337 and 339 are poled to conduct positive current respectively from the anode 321 to the junction J8 and from the junction J2 to the junction J8. It is seen that with switch PS closed, the junction J8 is at a potential approaching that of conductor AL3 if either thyratron ST or thyratron AT2 is non-conducting but is at a potential approaching conductor AL2 if both thyratrons ST and AT2 are conducting.

Network KN2 includes a capacitor 351 shunted by a resistor 353. Network 1AN also includes a capacitor 361 shunted by a resistor 363. Network KN2 is connected to the junction J4 through a rectifier 365 poled to conduct positive current from the junction J4 to the network KN2 and through a resistor 367. The secondary 60S is connected between the networks 1AN and KN2 through a resistor 369 and a rectifier 371 poled to conduct positive current from the secondary 60S to the network KN2. This rectifier blocks the flow of positive current from the network KN2 to the network 1AN and permits current to flow to the network 1AN only when the right hand terminal of 60S is positive relative to the left hand terminal and the potential on 60S exceeds the potential on KN2. A resistor 373 is connected between the junction of the rectifier 371 and the other resistor 36 and the network 1AN. When both thyratrons WT1 and WT2 are non-conducting, the network KN2 is charged so that its terminal connected to the rectifier 371 from the secondary 60S is positive. If either of the thyratrons WT1 or WT2 is conducting, current flows through the primary 60P and because of the drop in potential across the primary, the charging of network KN2 is prevented. When network KN2 is charged, its potential is such as to prevent the flow of current from the secondary 60S through the rectifier 371 and the network KN2 during the half periods during which the right hand terminal of secondary 60S is positive and the other terminal negative.

Current can not flow through the rectifier 254 and through the primary 60P when conductor AL2 is positive relative to conductor AL1 because this current is blocked by the rectifier 11. The rectifier 254 in cooperation with the resistors 255 and 257 functions in the same way as the resistor 193 and the rectifier 195.

The control electrode 325 of thyratron AT2 is connected to conductor AL2 through a grid resistor 377 and the network 1AN. It is seen that when the network 1AN is charged, it impresses a blocking bias on thyratron AT2, but in the normal condition of the apparatus, the network 1AN being uncharged, thyratron AT2 is conducting.

Thyratron AT3 has an anode 381, a cathode 383 and a control electrode 385. Network 2AN has a capacitor 391 shunted by a resistor 393. The anode 381 of thyratron AT3 is connected to conductor DL3 through an inductor 395 capable of producing the required carry over as explained in certain of the above-listed applications. The cathode 383 is connected directly to conductor AL2. The control electrode 385 is connected to junction J3 through network 2AN and a grid resistor 397. The anode 381 of thyratron AT3 is also connected to junction J5. Junction J5 is connected to junction J2 through a contact 399 of the repeat non-repeat switch SW2 when the switch is in the non-repeat position and a rectifier 461. The rectifier 401 is poled to conduct positive current from the junction J2 to the junction J5.

Thyratron AT4 has an anode 411, a cathode 413 and a control electrode 415. Network 3AN has a capacitor 421 shunted by the resistor 423. The anode 411 of thyratron AT4 is connected to conductor AL3 through the primary 40P. The cathode 413 is connected to conductor AL2. The control electrode 415 is connected to junction J7 through network 3AN and a grid resistor 417.

A Sequence Timer which we have constructed and found to operate satisfactorily includes the following components:

| | |
|---|---|
| Voltage across secondary 1LS and and primary 2LP | 24. |
| Voltage across secondary 2LS | 115. |
| Rapid release resistor RZ | 1500 ohms. |
| Thyratrons OT, ST, WT1, WT2, HT, AT1, AT2, AT3, AT4 | each Westinghouse WL-2050. |
| Charging resistor 169 network IN | 100 ohms. |
| Capacitor 161 network IN | .25 microfarad. |
| Variable resistor 165 network IN | 1 megohm. |
| Fixed resistor 163 network IN | 22,000 ohms. |
| Capacitor 211 squeeze network SN | .25 microfarad. |
| Variable resistor 215 squeeze network | 1 megohm. |
| Fixed resistor 213 squeeze network | 22,000 ohms. |
| Capacitor 241 network WN | .25 microfarad. |
| Variable resistor 247 WN | .5 megohm. |
| Fixed resistor 243 WN | 22,000 ohms. |
| Shunted resistor 245 WN | .49 megohm. |
| Capacitor 281 hold network HN | .25 microfarad. |
| Variable resistor 287 | .5 megohm. |
| Fixed resistor 283 | 22,000 ohms. |
| Shunted resistor 285 | .49 megohm. |
| Capacitor 181 off network ON | .25 microfarad. |
| Variable resistor 185 | 1 megohm. |
| Fixed resistor 183 | 22,000 ohms. |
| Inductor ON | a low reactance such as a relay coil for example. |
| Capacitor 331 network KN1 | .1 microfarad. |
| Resistor 333 | 270,000 ohms. |
| Capacitor 351 network KN2 | 1 microfarad. |
| Resistor 353 | 47,000 ohms. |
| Charging resistor 367 for network KN2 | 6800 ohms. |
| Capacitor 361 network 1AN | .1 microfarad. |
| Resistor 363 | .1 megohm. |
| Capacitor 361 network 1AN | .1 microfarad. |
| Resistor 369 joining 60S to rectifier 371 | 3300 ohms. |
| Potential across 50S | 100 volts peak. |
| Capacitor 391 network 2AN | .1 microfarad. |
| Resistor 393 network 2AN | 4700 ohms. |
| Capacitor 421 network 3AN | .1 microfarad. |
| Resistor 423 network 3AN | 4700 ohms. |
| Resistor 193 to junction J1 | 4700 ohms. |
| Resistor 255 to anode of WT1 | 10,000 ohms. |
| Resistor 257 to anode of WT2 | 10,000 ohms. |
| Resistor 225 to junction J2 | 4700 ohms. |
| Secondary 50S peaking circuit | 100 volts peak. |
| Capacitor 219 in peaking circuit | .001 microfarad. |
| Inductor 217 in peaking circuit | a low reactance such as a relay coil for example. |
| Resistor 336 to anode of AT2 | 4700 ohms. |
| Resistor 293 to junction J5 | 4700 ohms. |
| Resistor 297 to junction J6 | 4700 ohms. |
| All grid resistors 197, 221, 223, 263, 291, 341, 377, 397, 423 | 10,000 ohms. |
| All surge suppressing capacitors (not labeled) | .002 microfarad. |

The presentation of component magnitudes in the above table is included only for the purpose of aiding those skilled in the art in practicing our invention and is not intended in any way to limit our invention.

*Stand-by*

In describing the stand-by operation we will refer to Fig. 7. This view shows the condition of the various thyratrons in the apparatus during stand-by and while welding. In each graph of Fig. 7 view, voltage is plotted vertically and time horizontally. Shading represents conduction of the thyratron to which the shaded graph corresponds. The voltages presented in Fig. 7a through g are the anode voltages of the various thyratrons as labelled when these thyratrons are non-conducting. When any thyratron conducts, its anode voltage collapses to the arc-drop magnitude. Graphs h and i represent the current through the solenoid VS and the welding current, respectively.

In the stand-by condition of the apparatus, the conductors L1 and L2 are energized by the closing of main switches or disconnects (not shown). The cathodes of the various thyratrons are then heated and transformers 1T, 2T and 1LT are supplied with potential so that conductors AL1, AL2, AL3, DL1 and DL3 are energized as is also secondary 1LS. The secondary 2HS of the heater transformer 2HT is connected across the heaters of thyratrons OT and WT1 through a resistor 431 so that premature firing of these thyratrons is prevented.

In the stand-by condition of the apparatus, switch SS is open so that there is no potential across secondary 2LS and relay RS is deenergized. Conductor AL4 is then disconnected from conductor AL2 and thyratrons WT and WT1 are deenergized. Network IN is charged through the normally closed contact 153 of relay RS to a potential such as to block thyratron ST. Network SN is also charged by grid conduction through the first control electrode 205 of thyratron ST by the potential delivered the junction J1. This charge is also such as to block thyratron ST. Similarly, network WN is charged by grid current flowing between the control electrode 235 and the cathode 231 of thyratron WT2 under the potential delivered at junction J2 and this potential is such as to block thyratron WT2. Network KN1 is similarly charged so as to block thyratron AT1. Network KN2 is charged from junction J4 but network 1AN is uncharged so that thyratron AT2 is conducting. Network 2AN is charged from junction J3 by grid conduction through thyratron AT3 and has a potential such as to block thyratron AT3. Network 3AN is similarly charged blocking thyratron AT4. Network HN is charged from junction J5 blocking thyratron HT.

Because thyratron OT is non-conducting, thyratrons SUT1 and SUT2 are blocked by the charging of the biasing networks B1 and B2 by the open circuit potential across thyratrons SUT1 and SUT2, respectively. The solenoid S1 is then deenergized and the valve V closed so that the electrode E2 is retracted from electrode E1.

Because thyratron AT1 is non-conducting, thyratron HCT1 is non-conducting. But, during the first half period during which potential of the proper polarity is applied to conductors L1 and L2, thyratron HCT2 can conduct beginning at an instant in this half period as set by the network PHS. Thyratron HCT2 conducts in a circuit extending from the left hand terminal of the secondary 2S1 through the resistor 117, the anode 111 and cathode 113 of thyratron HCT2, the rectifier RX, the primary OP, and the capacitor C in series with this primary. This conduction quickly charges the capacitor and the thyratron HCT2 is rendered non-conducting and remains non-conducting while the capacitor C is charged. The conduction of thyratron HCT2 also charges the capacitor AC is connected in series with it and the resistor 117 across the secondary 2S1 but this has no effect. The charging of the capacitor C through thyratron HTC2 is represented by the shaded strip in the first negative half wave on the left of Fig. 7f.

After the capacitor C is charged, further current does not flow through primary OP and thyratrons FT1 and FT2 are non-conducting as are also ignitrons I–1 and I–2. The apparatus is now ready for welding.

*Operation*

The operation will be explained with reference to Figs. 6 and 7. Fig. 7 has been described and a brief description of Fig. 6 appears desirable. In each of the graphs *a*, *b*, *c* and *d* of Fig. 6, voltage is plotted vertically and time horizontally. Graph *a* presents the anode voltage on thyratron AT1, when it is non-conducting, the conduction of the thyratron being indicated by the shading under the waves representing half periods during which the conduction takes place. Curve *b* presents the voltage appearing across the secondary 50S during the intervals when thyratron ST conducts. The carry over effect produces an abrupt drop in this voltage represented by the right hand slope of each of the waves. In graph *c*, the voltage across the inductor 217 is presented. This voltage is the differential of the voltage produced across the secondary 50S and is a voltage of very short duration compared to a period of the potential available across conductors L1 and L2, the graph *d* presents the sum of the voltages across the inductor and the voltage across network KN1 when the potential in this network is decaying. The line, graph *e*, intersecting graph *d* is the critical grid potential line for thyratron AT1.

The description of the operation will be restricted to the high speed operation with the switch SW2 in the repeat position. The low speed operation with the switch SW2 in the non-repeat position can readily be understood without further explanation.

To produce a weld, the work is positioned on electrode E1 or if the welder is a gun, the gun is held with the electrode E1 against the work. Thereafter, the switch SS is closed. The closing of the switch SS supplies potential across the secondary 2LS and relay RS is actuated. Relay RS remains actuated as long as the switch SS is closed.

The actuation of relay RS connects conductor AL4 to conductor AL2 and thyratron OT becomes conducting. Thyratron WT1 does not conduct because it is blocked by network WN. Once switch SS is closed and thyratron OT conducts, the relay RS is maintained actuated through thyratron OT and the operation cannot be interrupted by the dropping out of relay RS until at the end of a welding cycle when thyratron OT becomes non-conducting even if switch SS is opened in the middle of a welding cycle. The condition of the apparatus at this point is presented in Fig. 7. The switch SS is shown as closed just before the beginning of the second positive half period on thyratron OT, and thyratron OT is shown as conducting during this half period and thereafter (Fig. 7a).

The conduction of thyratron OT supplies potential to secondary 10S which impresses a counterbiasing potential on thyratron SUT1. The latter becomes conducting. The conduction of thyratron SUT1 reduces the charging potential on network B2 to a low magnitude and the resistor 53 in this network permits the network to discharge in an interval of the order of one half period. Thyratron SUT2 then becomes conducting. The conduction of thyratron SUT2 reduces the potential on network B1 and at the beginning of a subsequent half period, thyratron SUT1 becomes conducting. Thus, thyratrons SUT1 and SUT2 conduct during alternate half periods independently of the supply of potential through secondary 10S and current is supplied through the solenoid SV as represented by graph *h* of Fig. 7.

The actuation of relay RS also opens the normally closed contact 153 through which network IN is charged and this network discharges. The conduction of OT reduces the potential at junction J1 and network SN also discharges. Network SN discharges in the short time interval which is consumed by the electrode in moving over the short distance over which it moves following the welds of the series after the first weld. But, network IN discharges in a longer time interval sufficient to enable the welding electrode E2 to move from its initially retracted position to the work W. The effect of the discharging of networks IN and SN is then that while SN discharges sufficiently to permit thyratron ST to conduct in a short time interval, network IN maintains thyratron ST non-conducting for a longer interval during the first welding cycle. Further, once relay RS is actuated it remains actuated so long as switch SS remains closed. Thus, once switch SS is closed, network IN is not charged again and network IN operates only once during each repeat weld operation.

While the network IN is discharging, the valve V has opened and the electrode E2 is engaged with the work W. The building up of pressure on electrodes E1 and E2 causes the switch PS to close. Once network IN discharges, thyratron ST becomes conducting. The conduction of thyratron ST produces the short duration potentials across the inductor in the peaking network PK, but for the time being, these potentials are ineffective because the network KN1 is still charged.

But, the conduction of thyratron ST also reduces the potential at junction J2 permitting the network WN to discharge. The timing out of the network WN then starts substantially immediately after the conduction of thyratron ST. Since thyratrons AT2 and ST are now both conducting, the potential at junction J8 is reduced and network KN1 is permitted to time out. This network times out as shown in Fig. 6d and after a few periods corresponding to the desired maximum negative hold time, the network KN1 is sufficiently discharged to permit thyratron AT1 to conduct.

The thyratron first conducts beginning at about one quarter of a half period after the instant of zero potential. The conduction of thyratron AT1 causes potential to appear across the secondary 30S. This potential causes thyratron HCT1 to become conducting (Fig. 7). The conduction of thyratron HCT1 discharges the capacitor C in the Heat Control Unit and recharges it to the opposite polarity. In the absence of the capacitor AC between the charged capacitor C and the cathodes 115 of thyratrons HCT2 and HCT3, thyratron HCT1 would tend to conduct from the initially positive plate of the capacitor C through the primary OP, the thyratron HCT3, the anode 111 and the cathode 113 of thyratron HCT1, the resistor 117, and the secondary 2S1 to the negative plate of the capacitor. If at this time the network PHS is set to render thyratron HCT3 conducting later in the half period of the supply than the instant at which thyratron HCT1 conducts, the conduction just described would still take place, the effect being to charge the anode-cathode capacity of thyratron HCT3. This conduction, since it transmits current through the primary OP, would tend to produce premature firing of the firing thyratron FT1 and ignitor I–1. To avoid this improper firing, the auxiliary capacitor AC is connected between the negative plate of the main capacitor and the cathodes of thyratrons HCT2 and HCT3. This capacitor absorbs the initial rush of current through HCT1 in a circuit extending from the right-hand terminal of 2S1 through AC, 111, 113 of HCT1, 117 to left-hand terminal of 2S1 and reduces the flow of current to charge the interelectrode capacity of thyratron HCT3.

Assuming now that thyratron HCT1 is conducting without having produced premature firing, thyratron HCT3 is eventually rendered conducting at an instant determined by the setting of PHS, and current flows in the circuit described above through the primary OP. Thyratron FT1 and ignitor I–1 are then rendered conducting and supply current, and current flows through the secondary S and the work W. The flow of current through thyratron HCT1 and thyratron HCT3 charges the capacitor C and thyratrons HCT1 and HCT3 are rendered non-conducting as represented by the shaded strip in the fifth positive half wave from the left of Fig. 7f. Thereafter, at an instant predetermined by the network PHS, thyratron HCT2 is rendered conducting, again discharging the capacitor and recharging it to the opposite polarity through the rectifier and the primary OP, and at this time, thyratron FT2 and ignitron I–2 are rendered conducting to provide a second pulse of current.

Thyratron AT1 then conducts again. This time, the thyratron conducts at the beginning of its positive half period. The conduction of thyratron AT1 supplies potential through secondary 30S and thyratron HCT1 which is again rendered conducting to charge capacitor AC, but this time thyratron HCT1 starts to conduct substantially at the beginning of the positive half period if PHS is so set. The above described operation is again repeated and another pulse is transmitted through primary OP to render thyratron FT1 and ignitor I–1 conducting. The operations are now repeated, the ignitors I–1 and I–2 being rendered conducting to supply welding current alternately.

It is to be noted that during the first half period during which the welding current flows it can start to flow only about one quarter half period after the zero instant of potential because thyratron AT1 fires only at approximately the quarter period instant. (Thyratron AT1 can be set to fire later in the first half period if later firing is desirable.) But, after the first half period, the firing is in accordance with the setting of the network PHS. This mode of operation is shown in Fig. 7i. Because of this mode of operation, the transformer T is not saturated and excessive current is avoided.

While current is flowing through the thyratron AT1, network WN is timing out. Eventually, this network times out permitting thyratrons WT1 and WT2 to conduct. If these thyratrons and their associated circuits are in proper operating condition, both thyratrons conduct if not only one conducts. In either event, current is transmitted through the primary 60P and the charging of network KN2 is stopped. The network eventually discharges in a time interval corresponding to the maximum negative hold time. When it has discharged to a potential such that the peak potentials supplied through the secondary 60S exceed the potential of the network KN2, the network 1AN is charged. The charging of the network 1AN causes thyratron AT2 to become nonconducting. The junction J8 now rises to a magnitude near that of conductor AL3. Network KN1 is then charged and thyratron AT1 is rendered non-conducting to stop the operation of the Heat Control Unit and the Power Supply Unit.

If only one of the thyratrons WT1 or WT2 is conducting at this point, the flow of welding current is stopped, but the Sequence Timer jams and the sequence is not completed. If both thyratrons WT1 and WT2 conduct, the potential at junction J3 is reduced immediately on the conduction of thyratrons WT1 and WT2 and network 2AN immediately discharges permitting thyratron AT3 to conduct. The conduction of thyratron AT3 reduces the potential at junction J5 permitting the hold network HN to time out and to render thyratron HT conducting.

Potential is now supplied through the secondary 20S. This potential is of such magnitude as to counteract the potential impressed through secondary 10S and thyratron SUT1 is prevented from conducting. The blocking of thyratron SUT1 permits network B2 to charge blocking thyratron SUT2. The supply of current through the solenoid SV is interrupted and the valve V opens.

It is to be noted that the timing out of the hold network HN starts immediately on the rendering conducting of thyratrons WT1 and WT2 while rendering non-conducting thyratron AT1 and the stopping of welding current takes place only after network KN2 times out. The network HN may be set to time out before the welding current is interrupted. This would occur if the variable resistor in this network is set at one of its negative settings (Fig. 5). Thus, negative hold time corresponding to the negative setting would be in effect.

Once thyratron HT becomes conducting, the potential at junction J7 is reduced and network 3AN discharges. This network discharges in an interval of the order of a half period as shown in Fig. 7d and thyratron AT4 is rendered conducting. Potential now appears across secondary 40S to charge network ON. The charging of network ON impresses a blocking potential on thyratron OT and it becomes non-conducting. The resulting interruption of the supply of current through secondary 10S has no effect on relay RS. Since a repeat operation is being carried out, switch SS remains closed. The non-conduction of thyratron OT raises the potential at junction J1 approximately to the potential of AL1 and network SN is recharged to render thyratron ST non-conducting. This time network IN is not effective because relay RS is still actuated. Thyratron ST is rendered non-conducting by the charge on network SN or the opening of switch PS whichever occurs first, and the potential of junction J2 is raised approximately to that of AL3 so that network WN is charged and thyratrons WT1 and WT2 become non-conducting. In addition, the supply of potential to the peaking circuit PK is interrupted discontinuing the supply of peaks in the control circuit of thyratron AT1. The supply of potential through primary 60P is now stopped and network KN2 is charged. Network 1AN is then permitted to discharge and thyratron AT2 becomes conducting. This has no effect because network KN1 had already been charged to block thyratron AT1. The non-conduction of thyratrons WT1 and WT2 also permits network 2AN to charge so that thyratron AT3 becomes non-conducting. This raises the potential at junction J5 to charge network HN and block thyratron HT. Network 3AN then charges, blocking thyratron AT4 and removing the potential across secondary 40S. Network ON then discharges.

The inductance in this network ON causes a potential with leading phase to be impressed in the control circuit of thyratron OT so that once the network ON is discharged thyratron OT is rendered conducting again at the beginning of a positive half period since switch SS is still closed. Another weld is now produced.

The above-described operation may now be repeated until the work W is completely welded. Thereafter, the switch SS is opened and at the end of the welding cycle following the opening of the switch SS, relay RS drops out and thyratron OT remains non-conducting.

*Conclusion*

As appears from the above description, we have invented a high speed welder including a sequence timer of novel structure with its complexity connections reduced to a minimum. This invention involves not only the welder itself, but a novel relay circuit, a novel peaking circuit, a novel solenoid actuating unit and other novel components.

While we have shown and described a certain specific embodiment of our invention, many modifications thereof are possible. Our invention therefore is not to be restricted except insofar as is necessitated by the spirit of the prior art.

We claim as our invention:

1. In combination alternating current power supply means having a first terminal and a second terminal, a first capacitor, a second capacitor, first, second and third electric discharge devices, each device having an anode, a cathode and a control electrode, a rectifier, means connecting in series said first and second terminals, said first capacitor, said rectifier and said anode and cathode of said first device, means connecting said anode and cathode of said second device in inverse parallel with said rectifier, means connecting said anode and cathode of said third device in inverse parallel with said anode and cathode of said first device, means connected between said control electrode and cathode of said first device for impressing a potential displaced in phase with reference to said alternating potential between said control electrode and cathode of said first device, means connected between said control electrode and cathode of said second device for impressing a potential between the control electrode and cathode of said second device substantially in opposite phase to the potential between the control electrode and cathode of the first device, means connecting in series said terminals, said second capacitor and said anode and cathode of said third device, and means connected to the control electrode of said third device for impressing a timing signal thereon.

2. In combination alternating current power supply means having a first terminal and a second terminal, a first capacitor, a second capacitor, first, second and third electric discharge devices, each device having an anode, a cathode and a control electrode, a rectifier, output means, means connecting in series said first and second terminals, said first capacitor, said rectifier, said output means and said anode and cathode of said first device, means connecting said anode and cathode of said second device in inverse parallel with said rectifier, means connecting said anode and cathode of said third device in inverse parallel with said anode and cathode of said first device, means connected between said control electrode and cathode of said first device for impressing a potential displaced in phase with reference to said alternating potential between said control electrode and cathode of said first device, means connected between said control electrode and cathode of said second device for impressing a potential between the control electrode and cathode of said second device substantially in opposite phase to the potential between the control electrode and cathode of the first device, means connecting in series, in a circuit shunting said output means and said anode and cathode of said second device, said terminals, said second capacitor and said anode and cathode of said third device, and means connected to the control electrode of said third device for impressing a timing signal thereon.

3. Control apparatus for controlling the supply of current from an alternating current source to a welder with a welding transformer having a highly magnetizable core comprising in combination a power supply unit interposed between said source and said transformer for supplying current to said transformer, said unit including valve means capable of being rendered conducting a predetermined instant in the half periods of said alternating current to initiate the supply of current at said instants, a heat control unit connected to said power supply unit and including means for rendering said valve means conducting at pre-selected instants in the half periods of said alternating current, a sequence timer including an electric discharge device connected to be energized from said supply and means for rendering said device conducting during a selected number of successive alternate half periods of said supply, and means connecting said device to said heat control unit to actuate said heat control unit during a full period for each half period that said device is conducting, the said control apparatus being characterized by a sequence timer including rendering means which renders the device conducting approximately one quarter period after the beginning of the first of the selected number of half periods.

4. In combination with terminals for supplying an alternating potential, a heat control unit connected to said terminals to be energized by said supply and including means when actuated for supplying signals at predetermined instants in the half periods of said supply, an electric discharge device having an anode, a cathode and a control electrode, means connecting said anode and said cathode to said actuable means for actuating said actuable means when said device is conducting, means connected to said terminals and to said device for impressing anode-cathode potential on said device, and timing means connected between the control electrode and the cathode of said device for rendering said device conducting during selected, successive alternate half periods of said supply, the said combination being characterized by timing which renders said device conducting about one quarter period after the beginning of the first of said selected half periods.

5. In combination alternating current power supply means having a first terminal and a second terminal, a capacitor, first, second and third electric discharge devices, each device having an anode, a cathode and a control electrode, a rectifier, means connecting in series said first and second terminals, said capacitor, said rectifier and said anode and cathode of said first device, means connecting said anode and cathode of said second device in inverse parallel with said rectifier, means connecting said anode and cathode of said third device in inverse parallel with said anode and cathode of said first device, means connected between said control electrode and cathode of said first device for impressing a potential displaced in phase with reference to said alternating potential between said control electrode and cathode of said first device, means connected between said control electrode and cathode of said second device for impressing a potential between the control electrode and cathode of said second device substantially in opposite phase to the potential between the control electrode and cathode of the first device, a fourth electric discharge device having an anode, a cathode and a control electrode, means connecting said anode and cathode of said fourth device between the control electrode and cathode of said third device in such manner that said third device is conducting when said fourth device is conducting, and timing means connected between the control electrode and cathode of said fourth device for rendering said fourth device conducting during selected successive alternate half periods of said supply, said timing means rendering said fourth device conducting about one quarter period after the beginning of the first of said selected half periods and earlier in the remainder of said selected half periods.

6. A sequence timer particularly for high speed welding including a squeeze network for timing the squeeze time, a weld network for timing the weld time and a hold network for timing the hold time, means responsive to the timing out of said squeeze network for initiating a weld function, means responsive to the timing out of said weld network to terminate the weld function and start the hold function, and means responsive to the timing out of said hold network to terminate the hold function, the timing out of the hold time starting when the weld time has timed out, the said timer being characterized by a first auxiliary network connected to said weld function initiating means for delaying the initiation of said weld function as aforesaid by a first predetermined time interval following timing out of the squeeze network and by a second auxiliary network connected to said weld function terminating means for delaying its terminating operation as aforesaid by a second predetermined time interval.

7. The method of operating a sequence timer particularly for high speed welding, said timer including networks respectively for timing the squeeze, weld and hold functions of a welder which comprises causing the squeeze network to time out, initiating the weld function after a first predetermined time delay after the timing out of the squeeze network, permitting the weld time to time out while the weld function continues, initiating the timing out of the hold network on the timing out of the weld network, and terminating the welding function after a second predetermined time interval after the weld network times out.

8. Welding apparatus including a welding transformer; welding electrodes connected to said transformer; means for causing said electrodes to engage work, a power supply unit connected to said transformer and when actuated supplying current to said transformer; a sequence timer including a squeeze network, a weld network, a hold network, an electric discharge device, having an anode, a cathode and a control electrode, a control circuit connected between the control electrode and the cathode of the device and including means connected to said control electrode and responsive to the timing out of said squeeze network for rendering said device conducting a first predetermined time interval after said squeeze network times out, means responsive to the timing out of said squeeze network for initiating the timing out of said weld network substantially immediately on the timing out of said squeeze network, means connected to said control electrode and responsive to the timing out of said weld network for rendering said device non-conducting a second predetermined time interval after said weld network times out, means responsive to the timing out of said weld network for initiating the timing out of the hold network substantially immediately on the timing out of said weld network, and manual means for initiating the timing out of said squeeze network; means connected between said causing means and said sequence timer responsive to said sequence timer on initiation of the timing out of said squeeze network for causing said electrodes to engage work, and means connecting said anode and cathode of said device to said power supply unit for actuating said unit as aforesaid when said first device becomes conducting.

9. A sequence timer particularly for high speed welding having starting switch means, and squeeze, weld and hold timing components and including means for causing welding current to flow, means responsive to actuation of said starting switch means for initiating the timing out of said squeeze component, means responsive to the timing out of said squeeze component for initiating the timing out of said weld component substantially immediately after said squeeze component times out, and means responsive to the timing out of said weld component for initiating the timing out of said hold component substantially immediately after said weld component times out, the said sequence timer being characterized by means responsive to the timing out of the squeeze component for actuating said causing means a first predetermined time interval after the squeeze component times out, and by means responsive to the timing out of the weld component for terminating the operation of said causing means a second predetermined time interval after said weld component times out.

10. A sequence timer particularly for high speed welding having starting switch means, and squeeze, weld and hold timing components and including means for causing welding current to flow, means responsive to actuation of said starting switch means for initiating the timing out of said squeeze component, means responsive to the timing out of said squeeze component for initiating the timing out of said weld component substantially immediately after said squeeze component times out, and means responsive to the timing out of said weld component for initiating the timing out of said hold component substantially immediately after said weld component times out, the said sequence timer being characterized by means responsive to the timing out of the squeeze component for actuating said causing means a first predetermined time interval after the squeeze component times out, and by means responsive to the timing out of the weld component for terminating the operation of said causing means a second predetermined time interval substantially equal in duration to said first interval after said weld component times out.

11. In combination a first conductor, a second conductor, a third conductor, means for impressing alternating potentials in opposite phase between said first conductor and said second conductor and between said third conductor and said second conductor, a first electric discharge device having an anode, a cathode and a control electrode, a first time constant network, means connecting said anode to said third conductor, means connecting said cathode to said second conductor, means including said network connecting said control electrode to said first conductor, a second electric discharge device having an anode, a cathode and a control electrode, a second time constant network, means connecting said last-named anode to said first conductor, means connecting said last-named cathode to said second conductor, means including said second network connecting said control electrode to said third conductor, a third electric discharge device having an anode, a cathode and a control electrode, a fourth electric discharge device having an anode, a cathode and a control electrode, a third time constant network, a fourth time constant network, means responsive to the conduction of said first device for impressing a potential, means connecting the anode of said third device to said first conductor, means connecting the cathode of said third device to said second conductor, means connecting the anode of said fourth device to said third conductor, means connecting the cathode of said fourth device to said second conductor, means connecting in series said anode of said fourth device, said potential impressing means, said third network and said control electrode of said third device, means connecting said fourth network between said control electrode of said fourth device and said second conductor, means for charging said fourth network to a potential such as to maintain said fourth device normally conducting, and means responsive to the conduction of said second device for discharging said fourth network.

12. In combination a first conductor, a second conductor, a third conductor, means for impressing alternating potentials in opposite phase relationship between said first conductor and said second conductor and between said third conductor and said second conductor, a first electric discharge device having an anode, a cathode and a control electrode, a first time constant network, means connecting said anode to said third conductor, means connecting said cathode to said second conductor, means including said network connecting said control electrode to said first conductor, a second electric discharge device having an anode, a cathode and a control electrode, a second time constant network, means connecting said last-named anode to said first conductor, means connecting said last-named cathode to said second conductor, means including said second network connecting said control electrode to said third conductor, a third electric discharge device having an anode, a cathode and a control electrode, a fourth electric discharge device having an anode, a cathode and a control electrode, a third time constant network, a fourth time constant network, means responsive to the conduction of said first device for impressing a potential, of short duration compared to a period of said alternating current, means connecting the anode of said third device to said first conductor, means connecting the cathode of said third device to said second conductor, means connecting the anode of said fourth device to said third conductor, means connecting the cathode of said fourth device to said second conductor, means connecting in series said anode of said fourth device, said potential impressing means, said third network and said control electrode of said third device, means connecting said fourth network between said control electrode of said fourth device and said second conductor, means for charging said fourth network to a potential such as to maintain said fourth device normally conducting, and means responsive to the conduction of said second device for discharging said fourth network.

13. In combination a first conductor, a second conductor, a third conductor, means for impressing alternating potentials in opposite phase between said first conductor and said second conductor and between said third conductor and said second conductor, a first electric discharge device having an anode, a cathode and a control electrode, a first time constant network, means connecting said anode to said third conductor, means connecting said cathode to said second conductor, means including said network connecting said control electrode to said first conductor, a second electric discharge device having an anode, a cathode and a control electrode, a second time constant network, means connecting said last-named anode to said first conductor, means connecting said last-named cathode to said second conductor, means including said second network connecting said control electrode to said third conductor, a third electric discharge device having an anode, a cathode and a control electrode, a fourth electric discharge device having an anode, a cathode and a control electrode, a third time constant network, a fourth time constant network, means responsive to the conduction of said first device for impressing a potential, means connecting the anode of said third device to said first conductor, means connecting the cathode of said third device to said second conductor, means connecting the anode of said fourth device to said third conductor, means connecting the cathode of said fourth device to said second conductor, means connecting in series said anode of said fourth device, said potential impressing means, said third network and said control electrode of said third device, means connecting said fourth network between said control electrode of said fourth device and said second conductor, means for charging said fourth network to a potential such as to maintain said fourth device normally conducting, means responsive to the conduction of said second device for discharging said fourth network, a fifth electric discharge device having an anode, a cathode and a control electrode, a fifth time constant network, means connecting the anode of said fifth device to said third conductor, means connecting the cathode of said fifth device to said second conductor, and means connecting said fifth network between the control electrode of the fifth device and the anode of the second device.

14. A sequence timer particularly for high speed welding having starting switch means and squeeze, weld, hold and off timing components and including means for causing welding current to flow, means responsive to actuation of said starting switch means for initiating the timing out of said squeeze component, means responsive to the timing out of said squeeze component for initiating the timing out of said weld component substantially immediately after said squeeze component times out, and means responsive to the timing out of said weld component for initiating the timing out of said hold and off components substantially immediately after said weld component times out, the said sequence timer being characterized by means responsive to the timing out of the squeeze component for actuating said causing means a first predetermined time interval after the squeeze component times out, and means responsive to the timing out of the weld component for terminating the operation of said causing means a second predetermined time interval after said weld component times out.

15. A peaking circuit comprising in combination an electric discharge device of the gaseous type having an anode and a cathode, inductive reactance means, terminals for impressing an alternating potential, means connecting in series said terminals, said inductive reactance means, said anode and said cathode, a differentiating circuit coupled to said inductive reactance means and means for deriving the differential of the potential across said inductive resistance means from said differentiating circuit.

16. A peaking circuit comprising in combination an electric discharge device of the gaseous type, having an anode and a cathode, a transformer having appreciable inductive reactance means having a primary and a secondary, terminals for supplying an alternating potential, means connecting in series said terminals, said anode, said cathode and said primary, means connecting in series said secondary, a differentiating circuit connected in parallel with said secondary and means for deriving from said differentiating circuit potential equal to the differential of the potential across said secondary.

References Cited in the file of this patent

UNITED STATES PATENTS

| | | |
|---|---|---|
| 1,004,860 | Eastwood | Oct. 3, 1911 |
| 1,142,852 | Simon | June 15, 1915 |
| 1,915,566 | Younghusband | June 27, 1933 |
| 1,958,822 | House | May 15, 1934 |
| 2,158,885 | Palmer | May 16, 1939 |
| 2,166,309 | Love | July 18, 1939 |
| 2,239,053 | Roby | Apr. 22, 1941 |
| 2,295,601 | Overbeck | Sept. 15, 1942 |
| 2,390,981 | Bivens | Dec. 18, 1945 |
| 2,432,899 | Immel | Dec. 16, 1947 |
| 2,557,727 | Chandler | June 19, 1951 |
| 2,639,361 | Hartwig et al. | May 19, 1953 |
| 2,653,209 | Hartwig et al. | Sept. 22, 1953 |